United States Patent
Tomoda

(10) Patent No.: US 8,202,200 B2
(45) Date of Patent: Jun. 19, 2012

(54) CLUTCH CONTROL DEVICE

(75) Inventor: Akihiko Tomoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 545 days.

(21) Appl. No.: 12/496,701

(22) Filed: Jul. 2, 2009

(65) Prior Publication Data
US 2010/0029441 A1 Feb. 4, 2010

(30) Foreign Application Priority Data
Jul. 31, 2008 (JP) .................. 2008-198186

(51) Int. Cl.
- B60W 10/02 (2006.01)
- B60W 10/04 (2006.01)
- G06F 7/00 (2006.01)
- G06F 17/00 (2006.01)
- G06F 19/00 (2006.01)

(52) U.S. Cl. ............. 477/180; 477/174; 701/67; 701/68

(58) Field of Classification Search .................. 477/168, 477/174–176, 180; 701/67, 68
See application file for complete search history.

(56) References Cited

U.S. PATENT DOCUMENTS

| 6,023,648 A | * | 2/2000 | Murasugi et al. | 701/68 |
| 7,335,133 B2 | * | 2/2008 | Katou et al. | 477/167 |
| 2006/0293147 A1 | | 12/2006 | Adams et al. | |
| 2007/0276557 A1 | * | 11/2007 | Motosugi et al. | 701/22 |
| 2008/0234101 A1 | * | 9/2008 | Suzuki | 477/97 |
| 2009/0125201 A1 | | 5/2009 | Leibbrandt et al. | |

FOREIGN PATENT DOCUMENTS

| EP | 1 101 969 A1 | 5/2001 |
| JP | 2003-329064 A | 11/2003 |
| JP | 10 2006 014 141 A1 | 10/2007 |

* cited by examiner

Primary Examiner — Tisha Lewis
(74) Attorney, Agent, or Firm — Birch, Stewart, Kolasch & Birch, LLP

(57) ABSTRACT

A clutch control device providing an engagement feeling which conforms to a state of a vehicle without requiring a correction of an engagement position even when a clutch is worn. A clutch control device includes a vehicle state detection part for detecting a state of a vehicle, an actuator control part for controlling the actuator, a target torque decision part for deciding a target friction torque value Tt to be generated by the clutch in response to a time which elapses from a point in time that the engagement of the clutch starts as well as in response to a state of the vehicle, and a target oil pressure decision part for deciding a target oil pressure value Pt corresponding to the target friction torque value Tt. The actuator control part controls the actuator so as to set an oil pressure value to the target oil pressure value Pt.

20 Claims, 6 Drawing Sheets

CLUTCH CONTROL DEVICE

CROSS-REFERENCE TO RELATED APPLICATIONS

The present application claims priority under 35 USC 119 to Japanese Patent Application No. 2008-198186 filed on Jul. 31, 2008 the entire contents of which are hereby incorporated by reference.

BACKGROUND OF THE INVENTION

1. Technical Field

The present invention relates to a clutch control device. In a clutch for performing a connection/disconnection of power transmitted to a drive wheel from an engine in response to a liquid pressure the clutch control device controls the clutch from a state in which power is disconnected by the clutch (disengagement of the clutch) to a state in which power is connected by the clutch (engagement of the clutch).

2. Description of Background Art

A shift control device is known for a vehicle provided with a multi-position transmission. The shift control device electrically controls a clutch operation necessary for performing a shift operation using an actuator. In such a shift control device, there is a demand for rapid engagement of a clutch without shock.

For example, JP-A-2003-329064 discloses a technique which includes a means for detecting a power transmission state using a magnetic strain sensor, and increases a clutch engagement speed in a state where power is not transmitted and lowers the clutch engagement speed in a state where the power is transmitted.

However, in the technique disclosed in JP-A-2003-329064, when the clutch is worn, an engagement position of the clutch is changed. Accordingly, it is necessary to correct a position for changing an engagement speed or the like thus giving rise to a drawback that a control of the clutch is liable to become complicated.

Further, there is a demand for the clutch control device to acquire an engagement feeling which conforms to a state of a vehicle.

SUMMARY AND OBJECTS OF THE INVENTION

According to an embodiment of the present invention, a clutch control device is provided which can acquire an engagement feeling which conforms to a state of a vehicle without requiring the correction of an engagement position or the like even when a clutch is worn.

According to an embodiment of the present invention, a clutch control device is provided for a transmission for transmitting power generated by an engine to a drive wheel. A clutch for performing a connection/disconnection of power transmitted to the drive wheel from the engine in response to a liquid pressure. An actuator is provided for generating a liquid pressure necessary for engagement/disengagement of the clutch. A liquid pressure detection part detects the liquid pressure generated by the actuator with a vehicle state detection part detects a state of a vehicle. A control part performs a control of the actuator. The clutch control device further includes a target torque decision part for deciding a target friction torque value to be generated by the clutch in response to a time which elapses from a point in time that the engagement of the clutch starts as well as in response to a state of the vehicle. A target liquid pressure decision part decides a target liquid pressure value corresponding to the target friction torque value. The control part controls the actuator so as to set a liquid pressure value detected by the liquid pressure detection part to a value equal to the target liquid pressure value.

Due to such a construction, the target friction torque which conforms to a state of a vehicle is decided and a liquid pressure is controlled corresponding to the target friction torque. Thus, the clutch control device can acquire an engagement feeling which conforms to the state of the vehicle. Further, by adopting such a liquid pressure control instead of a position (stroke) control of the clutch, a clutch control is not influenced by wear of the clutch or the like. Thus, a complicated control such as a control which corrects an engagement position or the like becomes unnecessary. Still further, it is unnecessary to provide a particular sensor such as a magnetic strain sensor. Thus, the constitution is advantageous in reducing a manufacturing cost of the clutch control device.

According to an embodiment of the present invention, the target torque decision part may include an engine torque estimation part for estimating a torque of the engine and for setting an estimated torque as an engine torque estimated value with an additional torque decision part for deciding an additional torque value in response to a state of the vehicle. An addition part is provided which obtains the target friction torque value by adding the additional torque value to the engine torque estimated value.

Due to such a construction, the clutch is controlled so as to obtain the target friction torque value by adding the additional torque value which is properly set corresponding to a state of the vehicle to the engine torque estimated value. Thus, the clutch control device can acquire an engagement feeling which conforms to a state of the engine.

According to an embodiment of the present invention, the state of the vehicle detected by the vehicle state detection part may be at least one of a shift position of the transmission, an engine rotational speed, throttle opening, a vehicle speed and the engine torque estimated value.

Due to such a construction, a desirable additional torque value can be set in response to at least any one of the shift position of the transmission, the engine rotational speed, the throttle opening, the vehicle speed and the engine torque estimated value. For example, by setting a large additional torque value when the vehicle is in a state that a high engagement speed is desired and by setting a small additional torque value when the vehicle is in a state that a small engagement shock is desired, the clutch control device can acquire proper engagement performance corresponding to a state of the vehicle.

According to an embodiment of the present invention, an engine torque estimation part may decide the engine torque estimated value based on a map of engine torque estimated values which are preset corresponding to at least one of an engine rotational speed, throttle opening and an atmospheric pressure (an atmospheric pressure applied to the vehicle).

According to an embodiment of the present invention, the additional torque decision part may increase the additional torque value from a first additional torque value in response to the state of the vehicle at a point in time wherein the engagement of the clutch is started toward a second additional torque value which is larger than the first additional torque value.

In this case, the clutch is controlled such that a friction torque of the clutch is increased along with a lapse in time. Thus, even when there is a difference between an estimated engine torque and an actual engine torque, there is no possibility that the clutch excessively slides.

According to an embodiment of the present invention, the additional torque decision part may maintain the additional torque value at the second additional torque value after the additional torque value reaches the second additional torque value irrespective of a lapse in time.

According to an embodiment of the present invention, the additional torque decision part may set the first additional torque value and the second additional torque value such that the lower a shift position of the transmission, the smaller value the first additional torque value and the second additional torque value are set.

In a vehicle, the lower the shift position, the larger a shift shock becomes. By setting the first additional torque value and the second additional torque value to a small value, priority is assigned to the reduction of a shift shock over an engagement speed. Thus, the shift shock becomes small. On the other hand, the higher the shift position of the transmission, the smaller the shift shock becomes. Accordingly, by setting the first additional torque value and the second additional torque value to a large value, a priority is assigned to the engagement speed over the reduction of shift shock. Thus, the time necessary for a shift change can be further shortened.

According to an embodiment of the present invention, the clutch control device further includes a shift direction detection part for detecting a shift change direction, the additional torque decision part may be configured to set the first additional torque value and the second additional torque value to a large value when a shift-up is detected by the shift direction detection part and to set the first additional torque value and the second additional torque value to a small value when a shift-down is detected by the shift direction detection part.

In a vehicle, a shift shock in a shift-down operation is larger than a shift shock in a shift-up operation. By setting the first additional torque value and the second additional torque value to a small value in the shift-down operation, a priority is assigned to the reduction of the shift shock over an engagement speed. Thus, the shift shock becomes small. On the contrary, in the shift-up operation, the first additional torque value and the second additional torque value are set to a large value. Thus, priority is assigned to the engagement speed over the reduction of the shift shock. Thus, the clutch control device can further shorten the time necessary for the shift change.

As has been explained heretofore, according to the clutch control device of an embodiment of the present invention, the clutch control device can acquire an engagement feeling which conforms to a state of a vehicle without requiring a complicated control such as a control for correcting an engagement position or the like. Further, it is unnecessary to provide a particular sensor such as a magnetic strain sensor. Thus, the clutch control device is also advantageous in reducing a manufacturing cost of the clutch control device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, an embodiment of a clutch control device according to the present invention is explained in conjunction with FIG. 1 to FIG. 6. Here, the vehicle includes a four-wheeled vehicle and a motorcycle.

Figure 1:
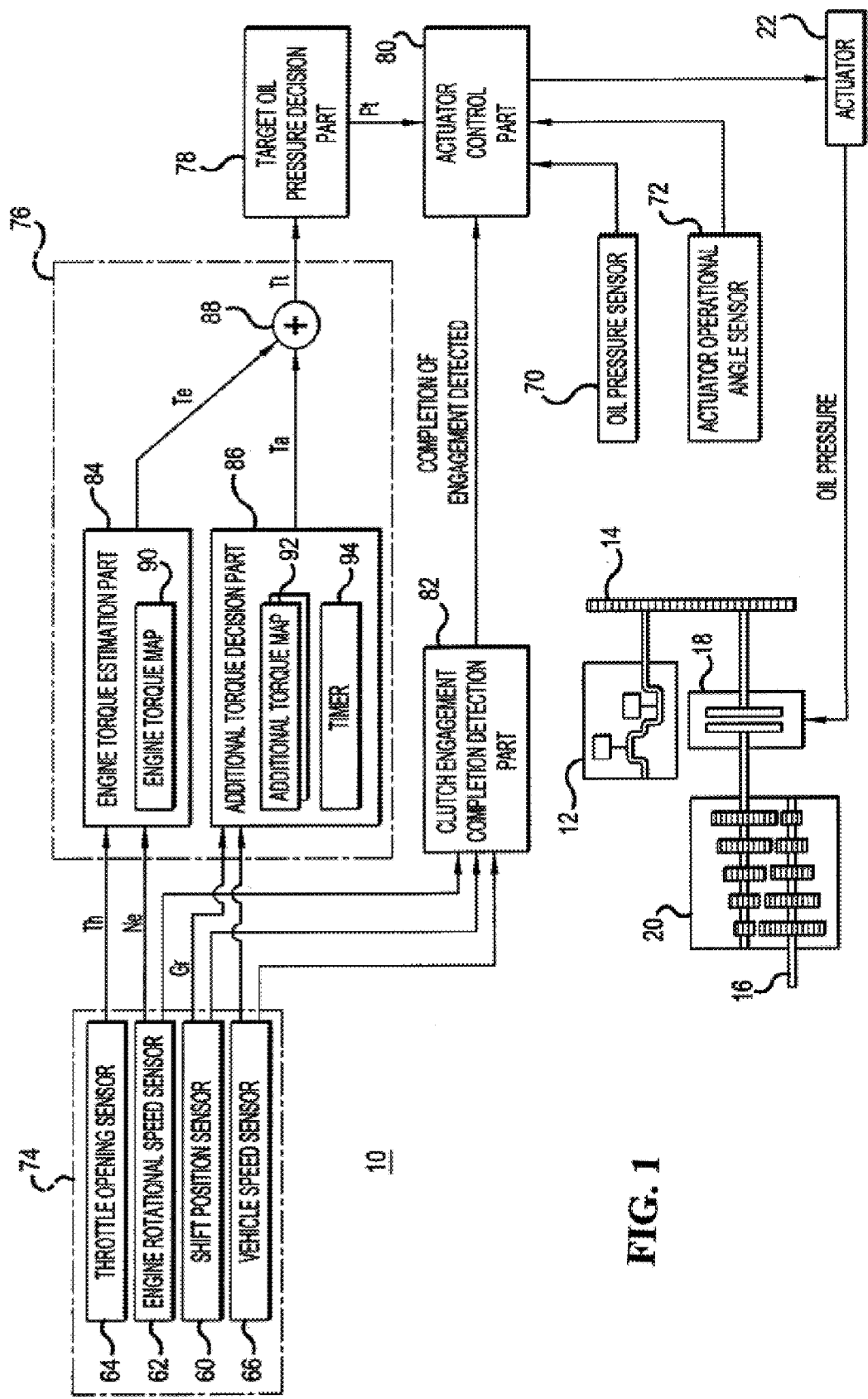
FIG. 1 illustrates a block diagram showing a vehicle provided with a clutch control device according to an embodiment.

The clutch control device 10 according to the embodiment includes, as shown in FIG. 1, an engine 12, primary speed reduction gears 14 for transmitting a drive force of the engine 12, a clutch 18 for performing a connection/disconnection of the power transmitted to an output shaft 16 from the engine 12 in response to an oil pressure, a transmission 20 for selectively changing a plurality of shift positions by rotating a shift drum not shown in the drawing, and an actuator 22 which generates a liquid pressure for engaging/disengaging the clutch 18. In the explanation made hereinafter, the disconnection of power transmitted to the output shaft 16 from the engine 12 by the clutch is referred to as a "disengagement of the clutch", and a connection of power transmitted to the output shaft 16 from the engine 12 by the clutch is referred to as an "engagement of the clutch."

Figure 2:
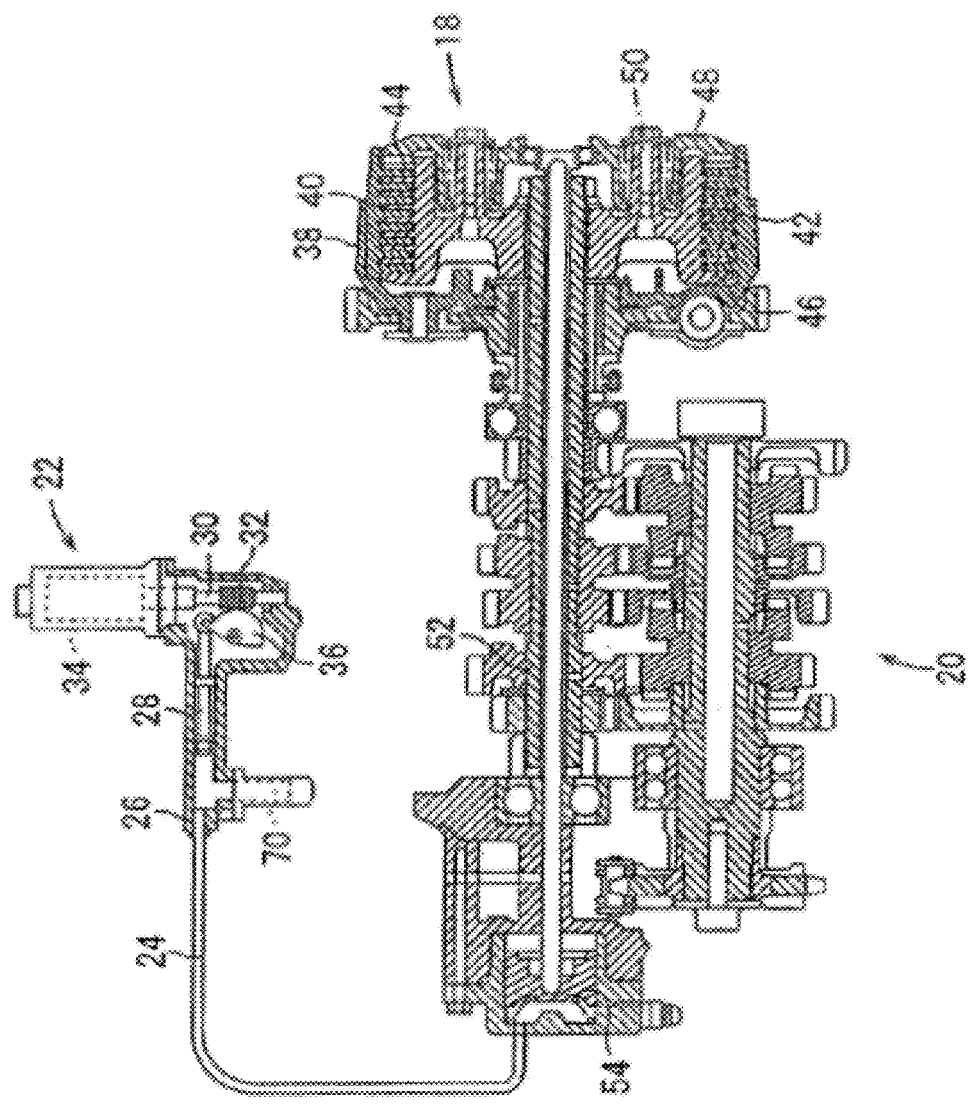
FIG. 2 illustrates an enlarged view showing a mechanism part of an actuator and a clutch of the vehicle.

The actuator 22 includes, as shown in FIG. 2, a master cylinder 26 which is connected to a hydraulic pipe 24, a master piston 28 which slides in the inside of the master cylinder 26, a motor 34 which fixedly mounts a worm gear 32 on a rotary shaft 30 thereof, and a sector-shaped worm wheel gear 36 to which a drive force of the motor 34 is transmitted via the worm gear 32. One end of the master piston 28 is connected to one end of the worm wheel gear 36. For example, when the motor 34 is rotated in the normal direction, the master piston 28 slides toward the hydraulic pipe 24 side so that an oil pressure (clutch oil pressure) in the hydraulic pipe 24 is elevated. To the contrary, when the motor 34 is rotated in the reverse direction, the master piston 28 slides toward the rotary shaft 30 side of the motor 34 so that the clutch oil pressure in the hydraulic pipe 24 is lowered.

The clutch 18, as shown in FIG. 2, transmits the drive force by making use of a friction force generated between a plurality of drive friction discs 40 mounted on a clutch outer 38 and a plurality of driven friction discs 44 mounted on a clutch inner 42. The drive friction disc 40 and the driven friction disc 44 are alternately arranged between a pressure receiving plate 46 provided to one end of the clutch inner 42 and a pressure applying plate 48.

The pressure applying plate 48 is biased by a clutch spring 50 arranged between the pressure applying plate 48 and the clutch inner 42. The pressure applying plate 48 pushes the drive friction discs 40 and the driven friction discs 44 together due to the biasing force and generates a friction force proportional to the biasing force. The stronger the biasing force, the stronger the friction force becomes so that a friction torque is increased.

Further, the pressure applying plate 48 is rotatably joined to a slave piston 54 by way of a push rod 52. The slave piston 54 is connected to the master cylinder 26 of the actuator 22 by way of the hydraulic pipe 24. Accordingly, a force applied to the slave piston 54 due to the elevation of the clutch oil pressure acts so as to decrease the biasing force applied to the pressure applying plate 48 by the clutch spring 50. Accordingly, when the clutch oil pressure is 0, the biasing force applied to the pressure applying plate 48 is largest, that is, the friction torque is largest. Along with the elevation of the clutch oil pressure, the biasing force is decreased so that the friction torque is decreased. When the clutch oil pressure becomes a predetermined value or more, the biasing force becomes 0, that is, the friction torque becomes 0.

In this manner, the clutch 18 can perform the connection/disconnection of a driving force corresponding to the clutch oil pressure generated by the actuator 22 which is controlled by the clutch control device 10. The transmission 20 is of a meshing clutch type which can select a gear change ratio at a plurality of positions. The gear change ratio is shifted to arbitrary positions including a neutral position by a shift pedal not shown in the drawing which is operated by a rider.

Further, the clutch control device 10, as shown in FIG. 1, includes a shift position sensor 60 for detecting a shift position Gr of the transmission 20, an engine rotational speed sensor 62 for detecting a rotational speed (engine rotational speed Ne) of the engine 12, a throttle opening sensor 64 for detecting a throttle opening Th, a vehicle speed sensor 66 for detecting a vehicle speed, an oil pressure sensor 70 for detecting a clutch oil pressure for disengaging/engaging the clutch 18, and an actuator operational angle sensor 72 for detecting an operational position of the actuator 22, for example, a rotational angle of the worm wheel gear 36 (see FIG. 2). Among these parts, the shift position sensor 60, the engine rotational speed sensor 62, the throttle opening sensor 64 and the vehicle speed sensor 66 constitute a vehicle state detection part 74 for detecting a state of the vehicle.

Further, the clutch control device 10 according to the embodiment includes, as shown in FIG. 1, a target torque decision part 76 for deciding a target friction torque value Tt to be generated by the clutch 18 in response to a time which elapses from a point in time that the engagement of the clutch 18 starts as well as in response to a state of the vehicle, a target oil pressure decision part 78 for deciding a target oil pressure value Pt corresponding to the target friction torque value Tt, an actuator control part 80 for controlling the actuator 22 so as to set an oil pressure value detected by the oil pressure sensor 70 to a value equal to the target oil pressure value Pt, and a clutch engagement completion detection part 82 for detecting that the clutch 18 is completely engaged.

The target torque decision part 76 includes an engine torque estimation part 84 for estimating a torque of the engine 12 and outputs an estimated torque as an engine torque estimated value Te, an additional torque decision part 86 for deciding an additional torque value Ta in response to a state of the vehicle, and an addition part 88 for obtaining the target friction torque value Tt by adding the additional torque value Ta to the engine torque estimated value Te.

Figure 3:
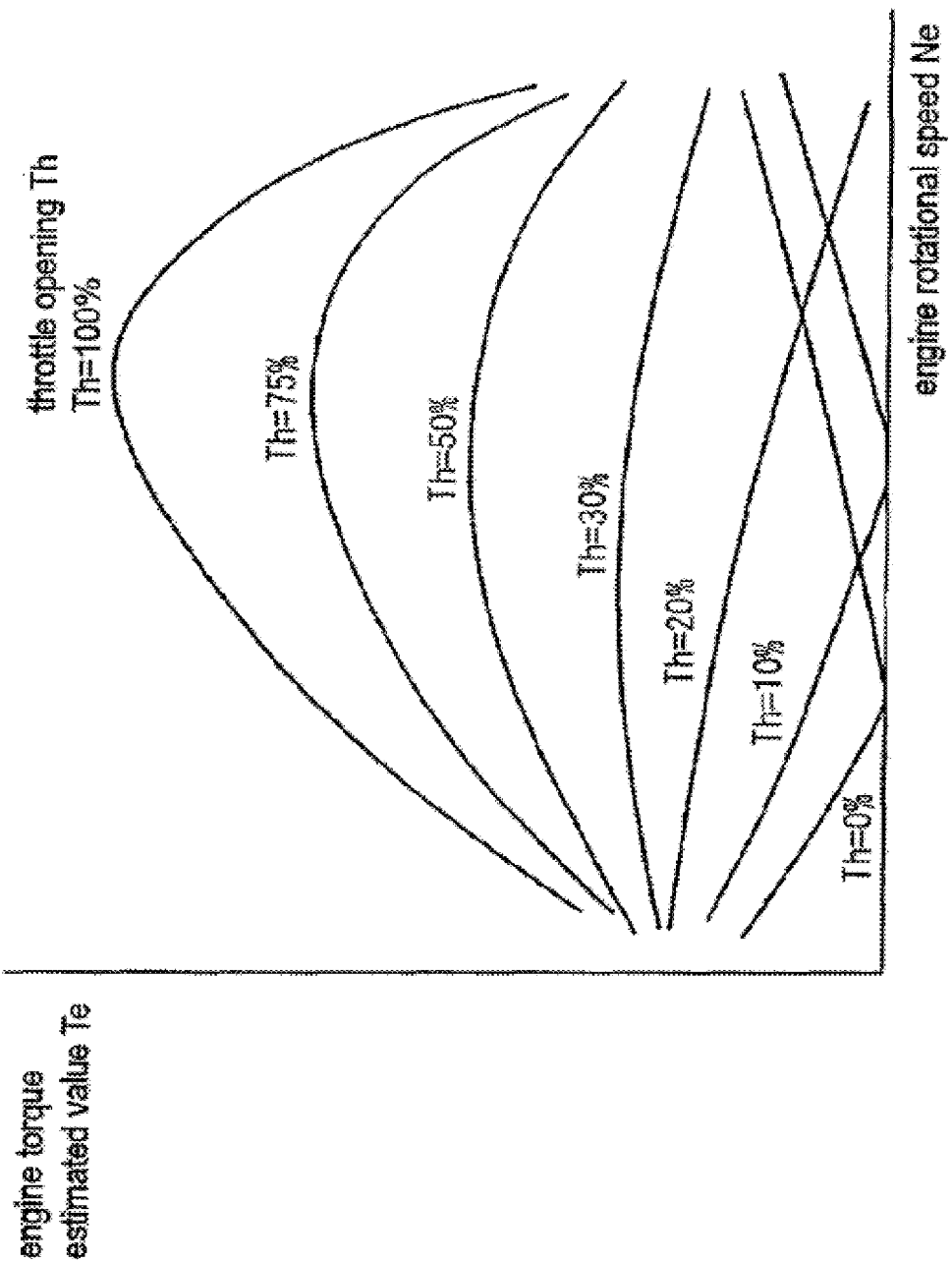
FIG. 3 illustrates a view schematically showing an engine torque map in a form of a characteristic curve.

The engine torque estimation part 84 includes an engine torque map 90 for describing the relationship among the engine rotational speed Ne, the throttle opening Th and the engine torque estimated value Te. In the engine torque map 90, as schematically shown in FIG. 3, the engine torque estimated value Te, which is an estimated value of an engine torque generated by the engine 12 corresponding to a value of the engine rotational speed Ne, and a value of the throttle opening Th is written. The engine torque estimated value Te is decided by preliminarily measuring a torque generated by the engine 12, for example.

Further, the engine torque estimation part 84 decides the engine torque estimated value Te based on the detected values (engine rotational speed Ne and throttle opening Th) from the engine rotational speed sensor 62 and the throttle opening sensor 64 and the engine torque map 90. Here, the engine 12 assumes a drive state in which the engine 12 drives the output shaft 16 and an engine brake state in which the output shaft 16 drives the engine 12. In both states, the engine torque estimated value Te is written in the engine torque map 90 as a positive value.

The additional torque decision part 86 includes an additional torque map 92 for describing first additional torque values T1 and second additional torque values T2 which are preset corresponding to shift positions, and a timer 94 for counting a time t which elapses from a point in time that the engagement of the clutch 18 starts.

Figure 4:
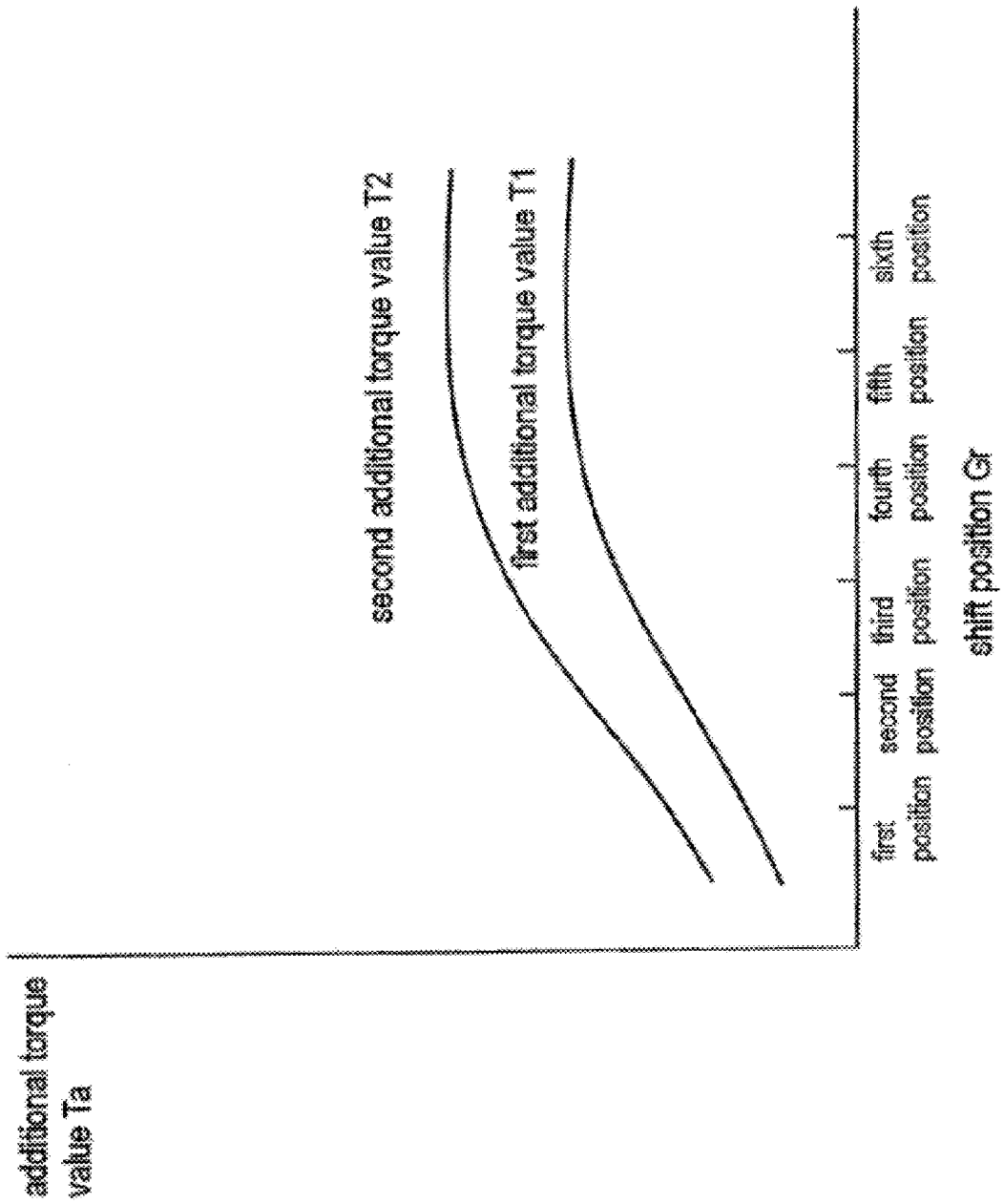
FIG. 4 illustrates a view schematically showing an additional torque map in a form of a characteristic curve.

In the additional torque map, as shown in FIG. 4 schematically, a first additional torque value T1 and a second additional torque value T2 corresponding to shift positions Gr are written. When the shift position Gr is small (that is, when a gear change ratio is large), a priority is assigned to the reduction of the shift shock over the engagement speed. Thus, the additional torque value is small. When the shift position Gr is large (that is, when the gear change ratio is small), priority is assigned to the engagement speed over the reduction of shift shock and hence, the additional torque value is large. Further, the second additional torque value T2 is set to a value larger than the first additional torque value T1.

Thereafter, the additional torque decision part 86 decides the first additional torque value T1 and the second additional torque value T2 based on a detected value (shift position Gr) from the shift position sensor 60 and the additional torque map 92, and calculates the additional torque value Ta based on the first additional torque value T1, the second additional torque value T2 and a time (time t which elapses from a point in time that the engagement of the clutch 18 starts) counted by the timer 94. After a predetermined time T elapses, the additional torque decision part 86 outputs the second additional torque value T2 as the additional torque value Ta.

More specifically, the additional torque decision part 86 decides the additional torque value Ta corresponding to a state of the vehicle (in this case, shift position Gr). The closer the additional torque value Ta approaches 0, the longer the engagement time becomes so that the engagement shock (shift shock) can be decreased. The larger the additional torque value Ta, the shorter the engagement time becomes so that the engagement shock is increased. Accordingly, the clutch control device can control the clutch with proper engagement time and proper engagement shock corresponding to a state of the vehicle.

The target oil pressure decision part 78 decides a target oil pressure value Pt corresponding to the target torque value Tt outputted from the target torque decision part 76 (the value decided by adding the additional torque value Ta to the engine torque estimated value Te). The conversion from the target torque value Tt into the target oil pressure value Pt is made using a following formula, for example.

$$Pt = P0 - k \times Tt$$

Pt: target oil pressure value, P0: constant
k: constant, Tt: target torque value Further, the target oil pressure value Pt may be decided using a map in which the relationship between the target torque value Tt and the target oil pressure value Pt is written.

The clutch engagement completion detection part 82 calculates a slide speed of the clutch 18 based on the engine rotational speed Ne, the shift position Gr, and the vehicle speed, and detects the completion of the engagement when the clutch 18 does not slide.

The actuator control part 80 controls the actuator 22 by driving the motor 34 (see FIG. 2) such that an oil pressure value detected by the oil pressure sensor 70 becomes the target oil pressure value Pt. To control the actuator 22 such that the oil pressure value becomes the target oil pressure value Pt, a known technique such as a PID control, for example, may be used.

Figure 6:
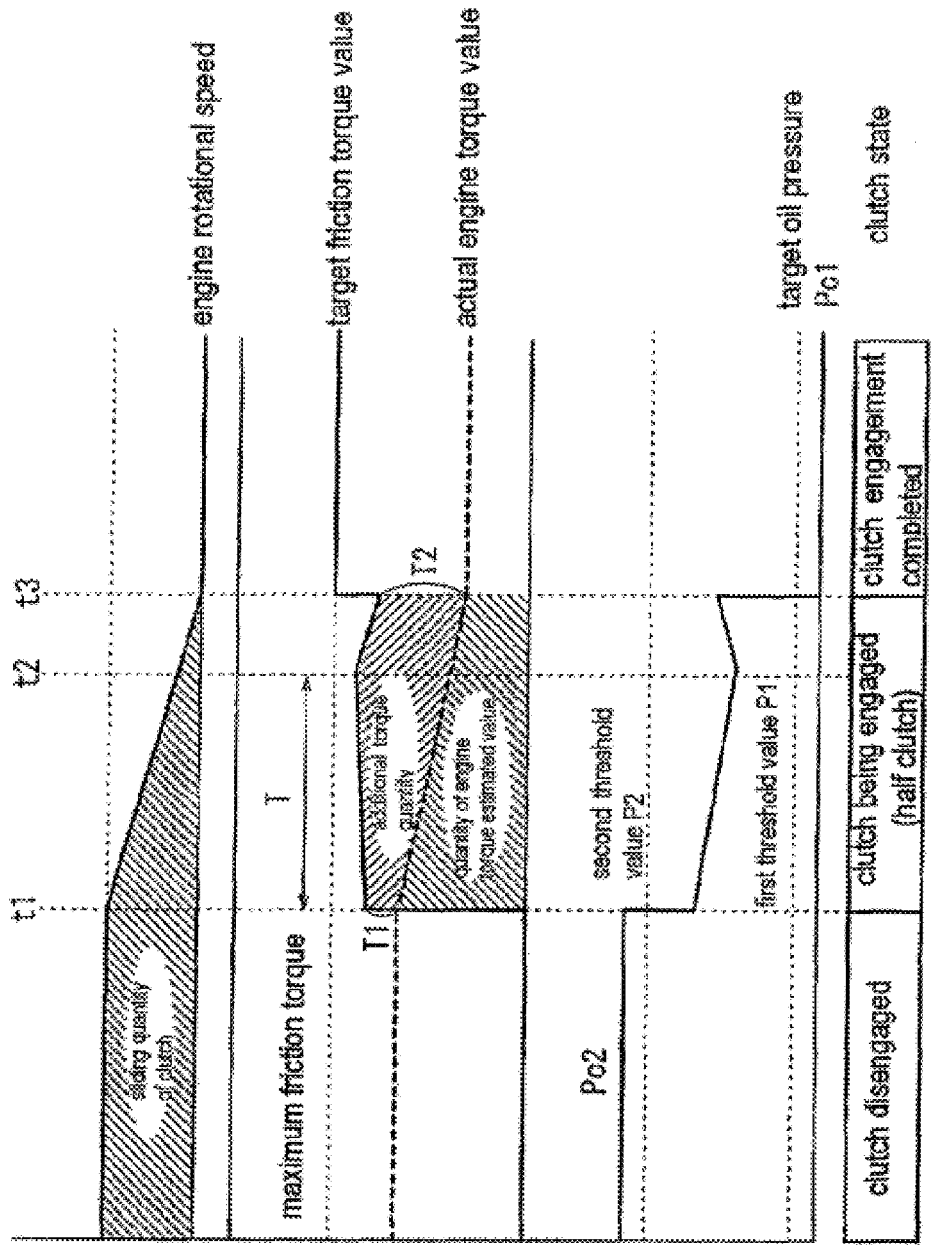
FIG. 6 illustrates a timing chart showing one example of the manner of operation of the clutch control device according to the embodiment.

Further, in this embodiment, for example, as shown in FIG. 6, assuming an oil pressure value at which the clutch 18 has a maximum friction torque as a first oil pressure value Pc1 and assuming an oil pressure value at which the clutch 18 assumes a completely disengaged state as a second oil pressure value Pc2, an oil pressure value which is set closer to the first oil pressure value Pc1 is assumed as a first threshold value P1, and an oil pressure value which is set closer to the second oil pressure value Pc2 is assumed as a second threshold value P2.

In this case, when the target oil pressure value Pt exceeds the first threshold value P1 (when the target oil pressure value Pt assumes a value smaller than the first threshold value P1), the actuator control part 80 controls the actuator 22 by driving the motor 34 such that a rotational angle of the worm wheel gear 36 which is detected by the actuator operational angle sensor 72 becomes equal to a first rotational angle A1 at which the clutch 18 has a maximum friction torque. Further, when the target oil pressure value Pt exceeds the second threshold value P2 (when the target oil pressure value Pt is set to a value larger than the second threshold value P2), the actuator control part 80 controls the actuator 22 by driving the motor 34 such that the rotational angle of the worm wheel gear 36 becomes equal to a second rotational angle A2 at which the clutch 18 assumes a completely disengaged state. Also in these controls, a known technique such as the PID control, for example, may be used.

In this embodiment, a torque value corresponding to a state of the vehicle is stored in the engine torque map 90 and the additional torque map 92 respectively. Torque values which correspond to a state of the vehicle are read from the engine torque map 90 and the additional torque map 92 respectively using the engine torque estimation part 84 and the additional torque decision part 86, and the target torque value Tt is decided based on these torque values. Then, the target torque value Tt is converted into an oil pressure value thus deciding the target oil pressure value Pt. However, in place of using the torque values of the respective torque maps, preliminarily-converted oil pressure values may be stored. In this case, the target oil pressure decision part 78 can be omitted.

Figure 5:
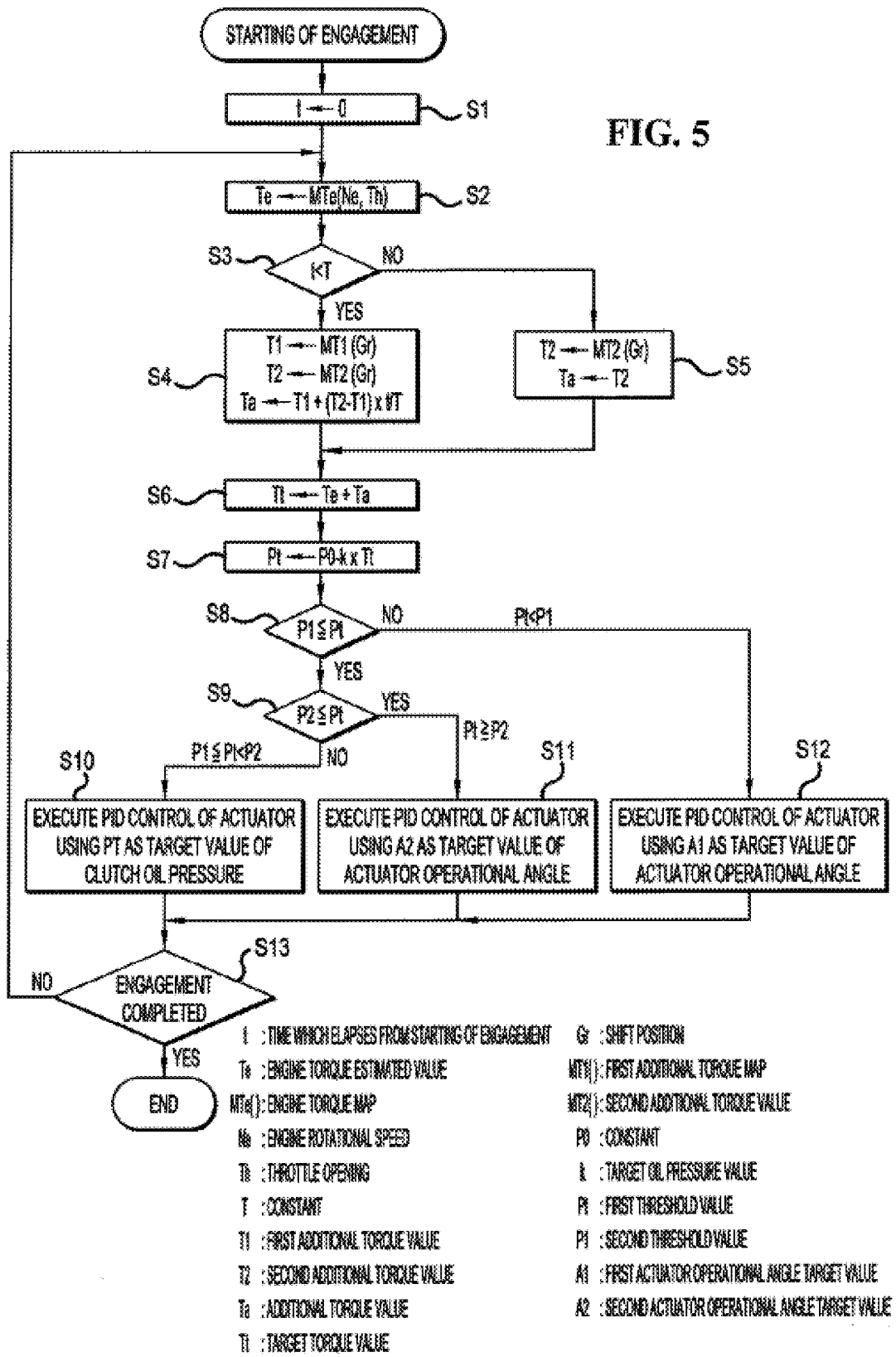
FIG. 5 illustrates a flowchart showing the manner of operation of the clutch control device according to the embodiment.

Next, the manner of operation of the clutch control device 10 according to this embodiment is explained also in conjunction with a flowchart shown in FIG. 5.

When the engagement of the clutch 18 starts, first of all, a time (elapsed time t) counted by the timer 94 is reset to 0 in step S1 in FIG. 5. That is, the timer 94 counts clock pulses supplied at predetermined time intervals, and the counted value indicates an elapsed time t. Hereinafter, the elapsed time t is also referred to as a counted time t.

Thereafter, in step S2, the engine torque estimation part 84 decides the engine torque estimated value Te based on the detected values (engine rotational speed Ne and throttle opening Th) from the engine rotational speed sensor 62 and the throttle opening sensor 64, and the engine torque map 90.

In step S3, the additional torque decision part 86 compares the counted value t counted by the timer 94 and the predetermined value T (predetermined number of pulses: predetermined time T) so as to determine whether or not the predetermined time T elapses from a point in time that the engagement of the clutch starts.

When it is determined that the predetermined time T does not elapse, the processing advances to step S4 where the additional torque decision part 86 decides the first additional torque value T1 and the second additional torque value T2 based on a detected value (shift position Gr) from the shift position sensor 60 and the additional torque map 92 and, further, calculates the additional torque value Ta based on the first additional torque value T1, the second additional torque value T2 and a count value counted by the timer 94. The additional torque value Ta can be obtained using a following calculation formula.

$$Ta = T1 + (T2 - T1) \times (t/T)$$

On the other hand, in step S3, when it is determined that the predetermined time T elapses from a point in time that the engagement of the clutch starts, the processing advances to step S5 where the additional torque decision part 86 decides the second additional torque value T2 based on a detected value from the shift position sensor 60 and the additional torque map 92 and assumes the second additional torque value T2 as the additional torque value Ta.

At a stage that the processing in step S4 or step S5 is finished, the processing advances to the next step S6. In this step S6, an addition part 88 of the target torque decision part 76 adds the engine torque estimated value Te from the engine torque estimation part 84 and the additional torque value Ta from the additional torque decision part 86 and decides the target torque value Tt.

In step S7, the target oil pressure decision part 78 decides the target oil pressure value Pt corresponding to the target torque value Tt from the target torque decision part 76.

Thereafter, in step S8 and step S9, the actuator control part 80 compares the target oil pressure value Pt with the first threshold value P1 and the second threshold value P2. When a comparison result exhibits the relationship Pt<P1, the processing advances to step S12. When the comparison result exhibits the relationship of P1≦Pt<P2, the processing advances to step S10. When the comparison result exhibits the relationship of Pt≧P2, the processing advances to step S11. As described previously, the first threshold value P1 is set to a value slightly larger than the first oil pressure value Pc1 at which the clutch has the maximum friction torque. Further, the second threshold value P2 is set to a value in the vicinity of the second oil pressure value Pc2 which is a boundary between a half clutch state and a disengagement state of the clutch 18.

In step S10, the actuator control part 80 performs a PID control of the actuator 22 such that an oil pressure value detected by the oil pressure sensor 70 becomes the target oil pressure value Pt.

In step S11, the actuator control part 80 performs a PIC control of the actuator 22 such that a rotational angle of the worm wheel gear 36 which is detected by the actuator operational angle sensor 72 becomes equal to the second rotational angle A2 at which the clutch 18 assumes a completely disengaged state.

In step S12, the actuator control part 80 performs a PID control of the actuator 22 such that a rotational angle of the worm wheel gear 36 becomes equal to the first rotational angle A1 at which the clutch 18 has the maximum friction torque.

At a stage wherein the processing in step S10, step S11 or step S12 is finished, the processing advances to step S13 where the clutch engagement completion detection part 82 determines whether or not the engagement of the clutch 18 is completed.

Further, when the clutch engagement completion detection part 82 determines that the engagement of the clutch 18 is completed, the clutch control device 10 finishes the clutch engagement control. When the clutch engagement completion detection part 82 determines that the engagement of the clutch 18 is not completed, the processing returns to step S2, and the above-mentioned clutch engagement control is continued.

In this embodiment, after the predetermined time T elapses from a point in time that the engagement of the clutch is started, the additional torque value Ta is fixed to the second additional torque value T2. However, the additional torque value Ta may be estimated by extrapolation (for example, linear extrapolation using a primary function) based on the first additional torque value T1 and the second additional torque value T2, and the additional torque value Ta may be continuously increased until the completion of the engagement of the clutch is detected.

Further, in this embodiment, exemplified is a case in which the present invention is applied to the constitution of the clutch 18 in which the friction torque of the clutch 18 is decreased corresponding to the increase of the oil pressure. However, it is needless to say that the present invention is also applicable to the constitution of the clutch 18 in which the friction torque of the clutch 18 is increased corresponding to the increase of the oil pressure. In this case, the setting of magnitude in the determination executed in step S8 and step S9 is reversed.

Next, the manner of operation of the clutch control device 10 according to this embodiment is explained in conjunction with a timing chart shown in FIG. 6.

The clutch 18 is initially in a disengagement state. In this state, the oil pressure value is equal to or more than the second threshold value P2, and the friction torque of the clutch 18 is 0.

Then, when the engagement of the clutch 18 starts at a point in time t1, the additional torque value Ta assumes the first additional torque value T1 at a point in time t1, and the additional torque value Ta is increased along with a lapse in time and assumes the second additional torque value T2 at a point in time t2 that a predetermined time T elapses. After the predetermined time T elapses, the additional torque value Ta is held at the second additional torque value T2. Although sliding of the clutch 18 takes place at a point in time t1, the friction torque of the clutch 18 is larger than the engine torque by an amount of the additional torque value Ta. Thus, a sliding speed of the clutch 18 is gradually decreased and becomes 0 at a point in time t3. The sliding speed of the clutch 18 is decreased so that the engine rotational speed Ne is decreased whereby the engine torque estimated value Te is also decreased along with the decrease of the engine rotational speed Ne.

When the sliding of the clutch 18 becomes 0 at a point in time t3, the completion of the engagement of the clutch 18 is detected so that the engagement control is finished.

Usually, after the engagement of the clutch 18 is completed, the clutch 18 is controlled to have the maximum friction torque. Accordingly, the oil pressure value becomes approximately 0.

In the clutch control device 10 according to this embodiment, the target friction torque value Tt, corresponding to a state of a vehicle, is obtained and a liquid pressure is controlled corresponding to the target friction torque value Tt. Thus, the clutch control device can acquire engagement feeling which conforms to the state of the vehicle. Further, by adopting such a liquid pressure control instead of a position (stroke) control of the clutch 18, a clutch control is not influenced by the wearing of the clutch 18 or the like. Thus, a complicated control such as a control which corrects an engagement position or the like becomes unnecessary. In addition, it is unnecessary to provide a particular sensor such as a magnetic strain sensor. Thus, the constitution is advantageous in reducing a manufacturing cost of the clutch control device.

Further, the clutch 18 is controlled so as to obtain the target friction torque value Tt by adding the additional torque value Ta which is properly set corresponding to a state of the vehicle to the engine torque estimated value Te. Thus, the clutch control device can acquire an engagement feeling which conforms to a state of the engine 12.

Due to such constitution, a desirable additional torque value Ta can be set in response to at least any one of the shift position Gr of the transmission 20, the engine rotational speed Ne, the throttle opening Th, the vehicle speed and the engine torque estimated value Te. For example, by setting a large additional torque value Ta when the vehicle is in a state that a high engagement speed is desired and by setting a small additional torque value Ta when the vehicle is in a state that a small engagement shock is desired, the clutch control device can acquire proper engagement performance corresponding to a state of the vehicle.

Further, the clutch 18 is controlled such that a friction torque of the clutch 18 is increased along with a lapse in time. Thus, even when there is a difference between an estimated engine torque and an actual engine torque, there is no possibility that the clutch 18 excessively slides.

Further, the first additional torque value Ta is set such that the lower the shift position Gr, the smaller the first additional torque value Ta becomes. Thus, priority is assigned to the reduction of the shift shock over the engagement speed whereby the shift shock becomes small. On the other hand, the first additional torque value Ta is set such that the higher the shift position Gr, the larger the first additional torque value Ta becomes. Thus, priority is assigned to the engagement speed over the reduction of shift shock whereby the clutch control device can further shorten the time necessary for the shift change.

Further, in this embodiment, the actuator 22 is controlled such that when the target oil pressure value Pt exceeds the first threshold value P1, a rotational angle of the worm wheel gear 36 which is detected by the actuator operational angle sensor 72 becomes equal to the first rotational angle A1 at which the clutch 18 has the maximum friction torque. In addition, when the target oil pressure value Pt exceeds the second threshold value P2, a rotational angle of the worm wheel gear 36 becomes equal to the second rotational angle A2 at which the clutch 18 assumes the completely disengaged state.

Usually, when the friction torque of the clutch 18 assumes a value in the vicinity of the maximum friction torque or assumes a value in the vicinity of a friction torque which brings the clutch 18 into a completely disengaged state, a change in the oil pressure becomes small. Thus, the control of the clutch 18 based on the oil pressure becomes difficult. However, as described above, by controlling the rotational angle of the worm wheel gear 36, the clutch control device can favorably perform a control of the clutch 18 even in such a state.

In the above-mentioned example, the additional torque decision part 86 sets the first additional torque value T1 corresponding to the shift position Gr. In addition to the above-mentioned setting, the additional torque decision part 86 may set the first additional torque value T1 such that the large first additional torque value T1 is set when the shift-up is carried out, and the small first additional torque value T1 is set when the shift-down is carried out. The detection whether the shift-up is carried out or the shift-down is carried out is made by calculating a sliding speed of the clutch 18 based on the engine rotational speed Ne, the shift position Gr or the vehicle speed, and by determining whether the sliding speed of the clutch 18 is positive or negative. When the rotational speed of the drive friction discs 40 is higher than the rotational speed of the driven friction discs 44, the sliding speed is a positive value so that the operation is determined as a shift-up operation. To the contrary, when the rotational speed of the drive friction discs 40 is lower than the rotational speed of the driven friction discs 44, the sliding speed of the clutch is negative so that the operation is determined as a shift-down operation.

More specifically, the additional torque decision part 86 determines whether the operation is a shift-up operation or a shift-down operation based on a detection signal from the engine rotational speed sensor 62, the shift position sensor 60 or the vehicle speed sensor 66. When it is determined that the operation is the shift-up operation, the additional torque decision part 86 sets the large additional torque value Ta, and when it is determined that the operation is the shift-down operation, the additional torque decision part 86 sets the small additional torque value Ta. To set the large additional torque value Ta, the large first additional torque value T1 and the large second additional torque value T2 may be set. To set the small additional torque value Ta, the small first additional torque value T1 and the small second additional torque value T2 may be set.

Usually, in a vehicle, shift shock in a shift-down operation is larger than shift shock in a shift-up operation. By adopting the above-mentioned control method, in the shift-down operation, priority is assigned to the reduction of shift shock over the engagement speed. Thus, the shift shock becomes small. To the contrary, in the shift-up operation, priority is assigned to the engagement speed over the reduction of shift shock. Thus, the clutch control device can further shorten the time necessary for the shift change.

In the above-mentioned embodiment, the case where the oil pressure is used in the clutch control is exemplified. In addition to the oil, a liquid which has a constant viscosity and can suppress the generation of rusts on equipment may be used.

It is needless to say that the clutch control device according to the present invention is not limited to the above-mentioned embodiments and can adopt various constitutions without departing from the gist of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clutch control device comprising:
    a transmission for transmitting power generated from an engine to a drive wheel;
    a clutch for performing connection/disconnection of power transmitted to the drive wheel from the engine in response to a liquid pressure;
    an actuator for generating a liquid pressure necessary for engagement/disengagement of the clutch;
    a liquid pressure detection part for detecting the liquid pressure generated by the actuator;
    a vehicle state detection part for detecting a state of a vehicle; and
    a control part for performing a control of the actuator; wherein
    the clutch control device further includes:
    a target torque decision part for deciding a target friction torque value to be generated by the clutch in response to a time which elapses from a point in time wherein the engagement of the clutch starts as well as in response to a state of the vehicle; and
    a target liquid pressure decision part for deciding a target liquid pressure value corresponding to the target friction torque value, and
    the control part controls the actuator so as to set a liquid pressure value detected by the liquid pressure detection part to a value equal to the target liquid pressure value.

2. The clutch control device according to claim 1, wherein the target torque decision part includes:
    an engine torque estimation part for estimating a torque of the engine and for setting an estimated torque as an engine torque estimated value;
    an additional torque decision part for deciding an additional torque value in response to a state of the vehicle; and
    an addition part for obtaining the target friction torque value by adding the additional torque value to the engine torque estimated value.

3. The clutch control device according to claim 2, wherein the state of the vehicle detected by the vehicle state detection part is at least one of a shift position of the transmission, an engine rotational speed, throttle opening, a vehicle speed and the engine torque estimated value.

4. The clutch control device according to claim 2, wherein an engine torque estimation part decides the engine torque estimated value based on a map of engine torque estimated values which are preset corresponding to at least one of an engine rotational speed, throttle opening, and an atmospheric pressure, an atmospheric pressure applied to the vehicle.

5. The clutch control device according to claim 3, wherein an engine torque estimation part decides the engine torque estimated value based on a map of engine torque estimated values which are preset corresponding to at least one of an engine rotational speed, throttle opening, and an atmospheric pressure, an atmospheric pressure applied to the vehicle.

6. The clutch control device according to claim 2, wherein the additional torque decision part increases the additional torque value from a first additional torque value in response to the state of the vehicle at a point in time that the engagement of the clutch is started toward a second additional torque value which is larger than the first additional torque value.

7. The clutch control device according to claim 3, wherein the additional torque decision part increases the additional torque value from a first additional torque value in response to the state of the vehicle at a point in time that the engagement of the clutch is started toward a second additional torque value which is larger than the first additional torque value.

8. The clutch control device according to claim 4, wherein the additional torque decision part increases the additional torque value from a first additional torque value in response to the state of the vehicle at a point in time that the engagement of the clutch is started toward a second additional torque value which is larger than the first additional torque value.

9. The clutch control device according to claim 6, wherein the additional torque decision part maintains the additional torque value at the second additional torque value after the additional torque value reaches the second additional torque value irrespective of a lapse in time.

10. The clutch control device according to claim 7, wherein the additional torque decision part maintains the additional torque value at the second additional torque value after the additional torque value reaches the second additional torque value irrespective of a lapse in time.

11. The clutch control device according to claim 8, wherein the additional torque decision part maintains the additional torque value at the second additional torque value after the additional torque value reaches the second additional torque value irrespective of a lapse in time.

12. The clutch control device according to claim 6, wherein the additional torque decision part sets the first additional torque value and the second additional torque value such that the lower a shift position of the transmission, the smaller the first additional torque value and the second additional torque value become.

13. The clutch control device according to claim 9, wherein the additional torque decision part sets the first additional torque value and the second additional torque value such that the lower a shift position of the transmission, the smaller the first additional torque value and the second additional torque value become.

14. The clutch control device according to claim 6, wherein the clutch control device further includes a shift direction detection part for detecting a shift change direction,
the additional torque decision part sets the first additional torque value and the second additional torque value to large values when shift-up is detected by the shift direction detection part, and
the additional torque decision part sets the first additional torque value and the second additional torque value to small values when shift-down is detected by the shift direction detection part.

15. The clutch control device according to claim 9, wherein the clutch control device further includes a shift direction detection part for detecting a shift change direction,
the additional torque decision part sets the first additional torque value and the second additional torque value to large values when shift-up is detected by the shift direction detection part, and
the additional torque decision part sets the first additional torque value and the second additional torque value to small values when shift-down is detected by the shift direction detection part.

16. A clutch control device comprising:
a transmission for transmitting power generated from an engine to a drive wheel;
a clutch for selectively connecting and disconnecting power transmitted to the drive wheel from the engine in response to a liquid pressure;
an actuator for generating the liquid pressure necessary for engaging and disengaging the clutch;
a pressure detector for detecting the liquid pressure generated by the actuator;
a vehicle state detector for detecting a state of a vehicle; and
a controller for performing a control of the actuator; wherein
the clutch control device further includes:
a target torque decider for deciding a target friction torque value to be generated by the clutch in response to a time which elapses from a point in time wherein the engagement of the clutch starts as well as in response to a state of the vehicle; and
a target liquid pressure decider for deciding a target liquid pressure value corresponding to the target friction torque value, and
the controller for controlling the actuator so as to set a liquid pressure value detected by the liquid pressure detection part to a value equal to the target liquid pressure value.

17. The clutch control device according to claim 16, wherein the target torque decider includes:
an engine torque estimator for estimating a torque of the engine and for setting an estimated torque as an engine torque estimated value;
an additional torque decider for deciding an additional torque value in response to a state of the vehicle; and
an addition part for obtaining the target friction torque value by adding the additional torque value to the engine torque estimated value.

18. The clutch control device according to claim 17, wherein the state of the vehicle detected by the vehicle state detector is at least one of a shift position of the transmission, an engine rotational speed, throttle opening, a vehicle speed and the engine torque estimated value.

19. The clutch control device according to claim 17, wherein an engine torque estimator decides the engine torque estimated value based on a map of engine torque estimated values which are preset corresponding to at least one of an engine rotational speed, throttle opening, and an atmospheric pressure, an atmospheric pressure applied to the vehicle.

20. The clutch control device according to claim 18, wherein the additional torque decider increases the additional torque value from a first additional torque value in response to the state of the vehicle at a point in time that the engagement of the clutch is started toward a second additional torque value which is larger than the first additional torque value.

* * * * *